United States Patent [19]
Locatelli et al.

[11] Patent Number: 5,654,639
[45] Date of Patent: Aug. 5, 1997

[54] INDUCTION MEASURING DEVICE IN THE PRESENCE OF METAL WALLS

[75] Inventors: Marcel Locatelli, Montbonnot; Jean-Jacques Chaillout, St. Etienne de Croney; Christian Jeandey, St. Egreve, all of France

[73] Assignee: Commissariat a l'Energie Atomique, Paris, France

[21] Appl. No.: 571,494

[22] Filed: Dec. 13, 1995

[30] Foreign Application Priority Data

Jan. 10, 1995 [FR] France .................. 95 00200

[51] Int. Cl.$^6$ .................. G01V 3/28; G01V 3/24; G21C 17/00
[52] U.S. Cl. .................. 324/339; 324/239; 324/346; 324/368; 376/258
[58] Field of Search .................. 324/339, 346, 324/359, 368, 239–243; 376/258

[56] References Cited

U.S. PATENT DOCUMENTS

| | | | |
|---|---|---|---|
| 3,277,363 | 10/1966 | Schuster | 324/346 X |
| 3,329,891 | 7/1967 | Todd | 324/359 |
| 4,529,939 | 7/1985 | Kuckes | 324/346 |
| 4,593,770 | 6/1986 | Hoehn, Jr. | 324/346 X |
| 4,901,023 | 2/1990 | Vail, III | 324/359 X |
| 5,038,107 | 8/1991 | Gianzero et al. | 324/339 |
| 5,283,520 | 2/1994 | Martin et al. | 324/220 |

FOREIGN PATENT DOCUMENTS

| | | |
|---|---|---|
| 0 434 439 | 6/1991 | European Pat. Off. . |
| 0 618 463 | 10/1994 | European Pat. Off. . |

Primary Examiner—Gerard R. Strecker
Attorney, Agent, or Firm—Oblon, Spivak, McClelland, Maier & Neustadt, P.C.

[57] ABSTRACT

A device for the measurement by induction of a medium through a metal wall using a transmission portion permitting the induction of a signal in the medium beyond the metal wall and a receiver for receiving a signal transmitted by the medium in response to the induced signal. The transmission portion includes at least one current generator directly connected to the metal wall in such a way that the current passing into the wall induces a signal beyond the wall.

24 Claims, 7 Drawing Sheets

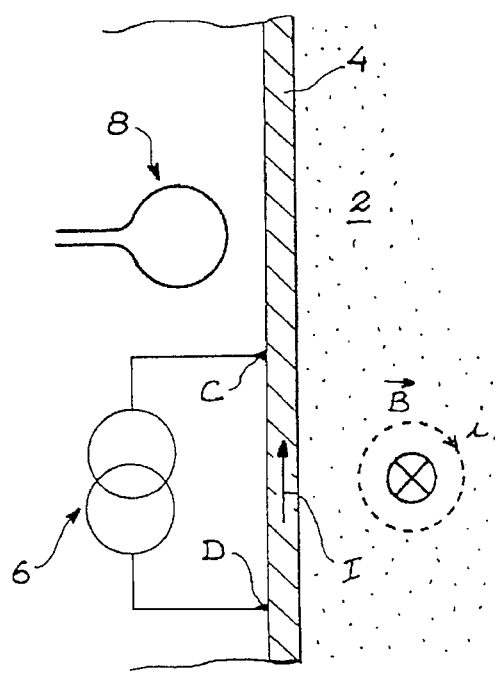
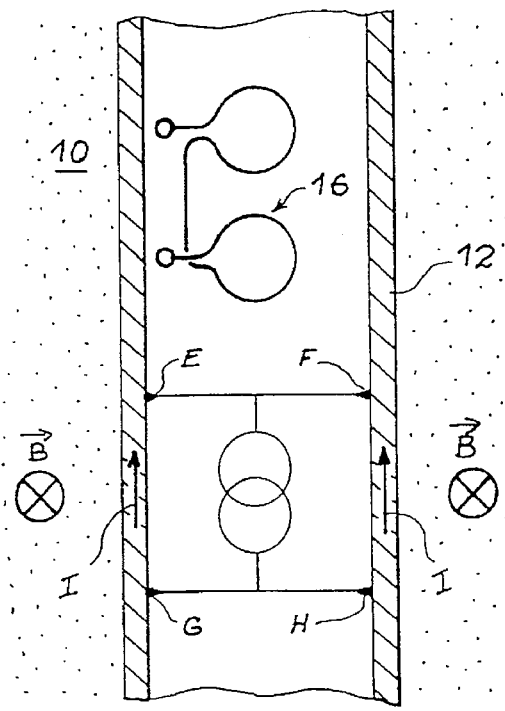
FIG. 1
FIG. 2A
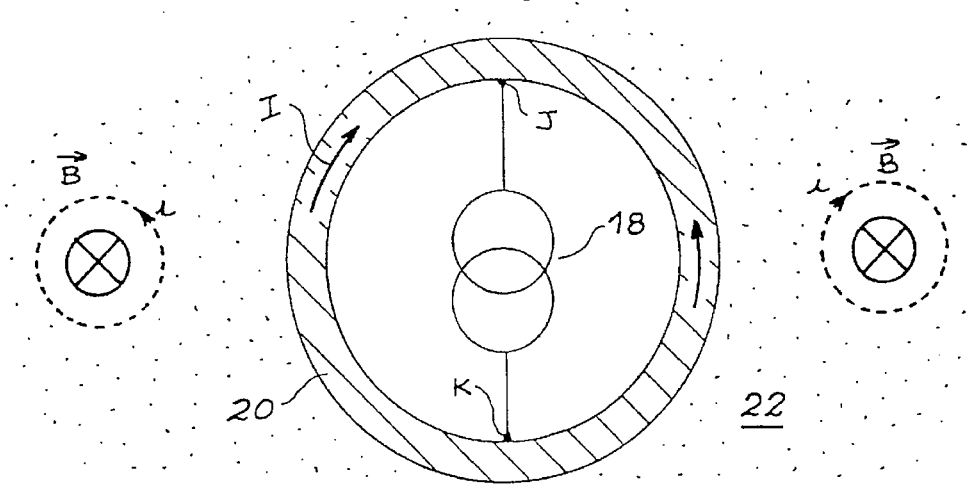
FIG. 2B

INDUCTION MEASURING DEVICE IN THE PRESENCE OF METAL WALLS

DESCRIPTION

1. Technical Field

The present invention relates to the field of the measurement and characterization of a medium with the aid of an induction device and in the presence of a metal wall.

This type of measurement is particularly encountered in the characterization of geological formations traversed by a bored or cased well. The knowledge of certain electrical or magnetic parameters of said geological formations (e.g. the electrical resistivity or magnetic permeability) is of very great interest in the field of oil exploration and exploitation. Particularly in the exploitation field, the knowledge of the oil-water interface is vital. With wells using oil sludges, the induction method is the only one which can be used.

The invention is also usable in the field of inspection and control in nuclear power stations.

2. Prior Art

U.S. Pat. No. 5,038,107 describes a device having a generally axial configuration in particular comprising a saturator with a flux concentrator, as well as induction focussing ferrites. In such a device, the presence of the wall between the measuring device and the object to be measured (the medium located beyond the metal wall) gives rise to a screening phenomenon linked with the appearance of eddy currents in the wall. Thus, the signal is attenuated according to an exponential law:

$$S = S_0 \cdot e^{(-t/\delta)},$$

in which t is the wall thickness and δ the skin thickness. The thickness δ is given by the formula:

$$\delta = 1/(\mu\sigma\epsilon\omega/2)^{1/2}$$

in which μ is the magnetic permeability, σ the electrical conductivity, ε the dielectric permittivity and ω the ripple (=2πf, f being the frequency of the current).

To reduce the screening effect, one solution consists of reducing the permeability μ by superimposing a static magnetic field. The reduction coefficient is then approximately 10/μ, i.e. approximately 20. For this purpose a saturator is used, as described in U.S. Pat. No. 5,038,107.

However, the presence of the wall still leads to a screening phenomenon.

In general terms, it is necessary to find a device and a process making it possible to solve the problem of the screening effect due to a metal wall located between an induction measuring device and the medium to be measured.

In the case of the device of U.S. Pat. No. 5,038,107, the elements are highly involved, the area to be saturated having to cover the entire device, the contact force due to the magnetic attraction being limited to deformations of brushes, the device being centered. Finally, it is necessary to adapt the external diameter of the brushes to the diameter of the tube.

DESCRIPTION OF THE INVENTION

The present invention solves the problem of the presence of a metal wall located between an induction-based measuring device and a medium to be measured.

To this end, it relates to a device for the measurement by induction of a medium in the presence of a metal wall having transmission means making it possible to induce a signal in the medium beyond the metal wall and means for receiving a signal retransmitted by the medium in response to the induced signal, characterized in that the transmission means are constituted by at least one current generator directly connected to the metal wall, so that the current passing into the wall induces a signal beyond the wall.

With this device, the wall is used as the transmitter and this leads to a reduction by a factor of $e^2$, i.e. approximately 7 of the attenuation coefficient of the signal. With this device the wall is only traversed once by the signal retransmitted from the medium to be measured in the direction of the reception means.

In this case that part of the wall which is traversed by the current of the generator has not been saturated, so that the magnetic energy necessary for the system is reduced.

Within the scope of the invention and in order to solve the secondary problem consisting of establishing a good contact between the generator and the wall, according to an embodiment, a device like that described hereinbefore is proposed, in which a rubbing contact is established between the generator and the metal wall. Contact is further improved if the rubbing contacts have a rough surface.

So as to facilitate the application of the rubbing contacts between the generators and the wall, the contacts can be applied by means of magnets.

In the case of a magnetic wall and in order to obtain freedom from the screening effect of the wall during the reception of the signal, according to an embodiment of the invention, a device of the type described hereinbefore is used also having means for magnetically saturating part of the wall, located between one portion of the medium to be measured and the reception means.

Thus, a partial saturation of the wall is obtained. Knowing that in order to saturate a wall much magnetic energy is required, a partial saturation reduces the number of magnets necessary for obtaining a good measurement. This permits the optimization of the magnetic energy to be supplied as a function of the configuration of the measuring elements.

The saturation means can be constituted by at least one magnetic circuit to be applied directly to the metal wall during the measurement by induction. With this device, there is then a direct magnetic attraction force between the metal wall and the magnetic circuits, which reduces the gaps between the saturation means and the wall and therefore the losses in the magnetic energy necessary for the saturation of the wall. As a result of the direct magnetic contact between the wall and the saturation means, the efficiency of the measuring device is not dependent on the internal shape of the wall or on any irregularities thereof. Thus, if the wall is a magnetic metal tube in a well, the efficiency of the device is not dependent on the internal diameter of the tube or on any irregularities of said diameter. Thus, the same saturator can be used for different tube diameters.

Such a magnetic circuit can be in the form of a longitudinal, median part with two lateral ends which are inwardly curved with respect to the medium part and each of which is terminated by a surface to come into contact with the metal wall.

The median part can either be made from a soft magnetic material forming the core of an electromagnet, or a hard magnetic material serving as a permanent magnet, or a combination of both.

According to another special embodiment, when the wall is a cylindrical wall, e.g. the wall of a cased well, it is possible to have at least two saturation elements like those described hereinbefore, the median parts of the different magnetic circuits being parallel to one another.

Reception means can then be distributed within a volume having a substantially cylindrical shape, the median parts of the different magnetic circuits defining generatrixes of said substantially cylindrical volume.

According to an embodiment, the magnetic circuit can have a plate-shaped, central part and two lateral parts, whose end comes into contact with the inner wall of a tube, along a zone parallel to the tube axis.

The central part can either be made from a soft magnetic material forming the core of an electromagnet, or a hard magnetic material serving as a permanent magnet, or a combination of both.

Alternatively, the central part can be formed by a metal sheet or plate and the lateral parts can in each case be formed by metal sheets or plates or metal elements forming a spring. This leads to a solution of the problem of adapting the contact between the lateral parts and the wall when the latter has irregularities.

Cutouts can also be made in at least one lateral part, said cutouts ensuring an even better adaptation of each magnetic circuit to the surface of the wall.

According to another aspect within the scope of this embodiment, the saturation means contain two magnetic circuits of the type described hereinbefore and arranged substantially in parallel.

The detection means can then be located between two circuits and/or between at least one of the circuits and the wall.

According to another aspect within said same embodiment, several assemblies of saturators, each being constituted in the manner described hereinbefore, can be provided, the different groups being placed on a common axis, at a certain distance from one another, and detection means are located in the free space between two adjacent assemblies.

This configuration permits the leaving of more space for the detection means and also the use of more voluminous magnetic circuits, which permit the Injection of more magnetic energy in the, wall to be saturated. Thus, in the configuration according to which the detection means are positioned between two magnetic circuits, the volume available for said circuits is necessarily limited. If this limitation causes a problem, the alternating configuration of saturator, detection means and saturator is particularly suitable.

Two circuits of the same assembly of saturators can then be positioned so as to have the same magnetic orientation. The magnetic orientations of two adjacent assemblies can then be 180° from one another or 90° from one another. This leads to an axial saturation.

According to a variant, in each saturator assembly, the two magnetic circuits can be arranged so as to have an opposite magnetic orientation, which leads to a radial configuration.

The current generator can be in contact with the metal wall at points located on one side of a saturator assembly and at points located on the other side thereof.

BRIEF DESCRIPTION OF THE DRAWINGS

The features and advantages of the invention will be gathered more easily from the following description of non-limitative embodiments with reference to the attached drawings, wherein show:

FIG. 1 The principle of the invention for a planar metal wall.

FIGS. 2A & 2B The principle of the invention for a substantially cylindrical wall.

DETAILED DESCRIPTION OF EMBODIMENTS

Figure 3:
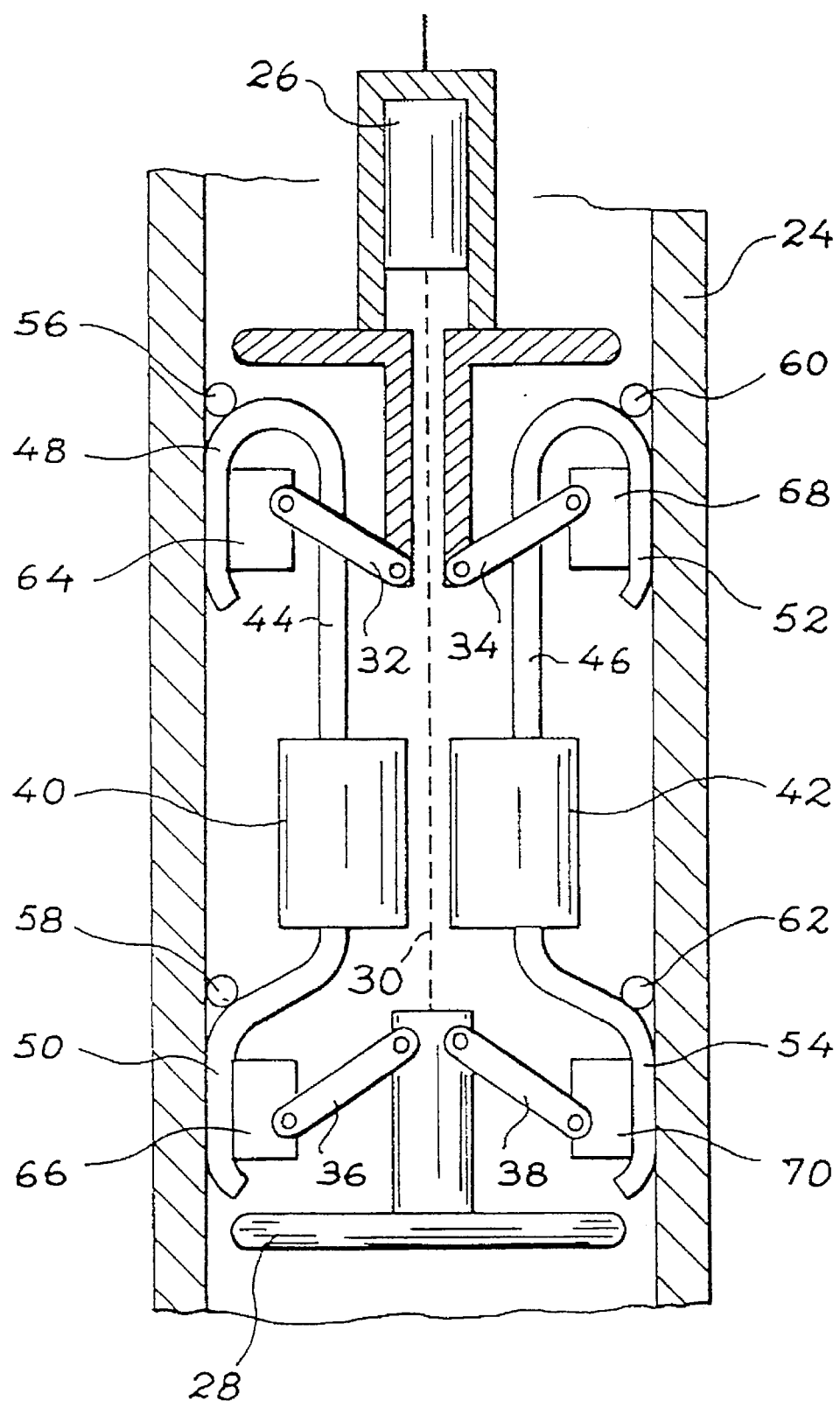
FIG. 3 An embodiment of the invention for a cased well.

A first embodiment is illustrated in FIG. 1, for the case where a medium 2 to be measured is located beyond a metal wall 4, e.g. having a substantially planar shape in the region where the measurement is performed. A current generator 6 is connected at two points C and D to the wall, so that a current I circulates in the portion of the wall closing the circuit with the generator 6. This current passing into the wall induces an induction B on the other side of the wall in the area of the medium 2 to be measured. Obviously the generator current and the current leads produce an induction beyond the wall, but this induction is attenuated due to the wall, which has a screening effect. The induction beyond the wall is mainly due to the current therein. In turn, this induction B produces eddy currents i in a plane perpendicular to the wall 4 and in the same plane as the current I supplied by the generator 6.

These eddy currents are detected by one or more detection coils 8. In order to have a good sensitivity, the turns of the detection coil or coils are preferably located in the same plane as the loop formed by the current generator 6 and the wall 4. A single coil 8 is shown in FIG. 1. Thus, in this case, the single coil detects on the one hand a direct induction produced by the generator 6 and on the other the signal retransmitted by the medium to be measured in response to the generation of the induction B. However, in the total signal, the contribution of the induction produced directly by the generator 6 can be considerably higher than the contribution of the signal which it is wished to measure (it can be approximately $10^6$ times higher). In order to solve the problem of this direct coupling between the generator and the coil, one solution consists of connecting two receiving coils in opposition, so that the direct couplings with the transmitter are equal in the two coils.

The assembly of the transmission and detection means is electrically connected by electrical connection means, such as e.g. cables, to control, analysis reception and/or data storage means arranged in a location remote from the area to be measured. These means will not be described in greater detail here and are known. This also applies with respect to all the embodiments described hereinafter.

FIG. 2A shows a device according to the invention, in the case where the medium 10 to be measured is located beyond a substantially cylindrical metal wall 12, such as the metal casing of a well. Such configurations are encountered in wells passing through geological formations. The device has a current generator 14 connected to the wall 12 at several points, e.g. at four points EFGH. Thus, a closed circuit is established, which includes a portion of the cylindrical wall in which will flow a current I. This current produces an induction B beyond the wall, in the part of the medium 10 which it is wished to study. In the same way as with a planar wall, one or more detection coils 16 are provided, preferably coils connected in opposition in such a way that the couplings of the two coils with the transmitted signals are equal.

FIG. 2B relates to a device for studying a medium located beyond a substantially cylindrical metal wall. In this FIG. 2B configuration, a current generator 18 is contacted with two points of the wall 20 located in the same plane perpendicular to the well axis, e.g. two diametrically opposite points J and K. A current I will then flow in the wall 20, but in a plane substantially perpendicular to the axis of the cased well, as in the circuits described hereinbefore, so that a magnetic induction B is generated in the area 22 of the medium which it is wished to study and this will in turn produce eddy currents I in a plane substantially perpendicular to the cased tube axis. These eddy currents are then detected by detection coils, not shown in FIG. 2B. In order to have a good sensitivity, the turns of these coils will be located in preferred manner in the same plane as the loop formed by the current generator and the current I. Here again, it is possible to have the two receiving coils connected in opposition, so as to become free of the direct induction produced by the generator 18 in the reception coils.

FIG. 3 illustrates an embodiment of the invention, in the case where the metal wall 24 has a substantially cylindrical shape. The device has means for bringing into contact with the wall connection means of at least one current generator and for moving them away from the wall during a displacement of the device.

According to the FIG. 3 embodiment, an electric jack 26 makes it possible to raise or lower a spacer 28 by means of a cable 30. The raising movement leads to a bending of the arms 32, 34, 36, 38. On each side of the cable 30, this movement controls that of an assembly constituted by a current generator 40, 42 and means for supplying current to the wall, e.g. a flexible cable 44, 46, whose ends 48, 50, 52, 54 ensure an electric contact with the metal wall 24. In the vicinity of the contact points with the wall elements 56, 58, 60, and 62 can directly fixed to each flexible cable 44 and 46 for cleaning the surface of the tube during the displacement of the device, which makes it possible to ensure a good contact between said inner surface and the ends of the flexible cables. Each of these cleaning means can be a file made from a hard, rough material, e.g. a ceramic material. The ends 48, 50, 52, 54 of the flexible cables 44, 46 intended to come into contact with the wall will preferably have a rough surface so as to improve contact. Finally, in the case where the tube 24 is made from a material which is both metallic and magnetic, magnets 64, 66, 68, 70 can be provided, e.g. in the vicinity of each end of the flexible cables, the effect of said magnets being to permit a better application of the ends of the cables at the contact point with the wall as a result of the magnetic attraction between the magnet and the magnetic wall. The use of rubbing contacts, having a rough surface, and/or means for cleaning the inner surface of the tube is particularly advantageous when the device is used in a well, e.g. in an oil well being exploited, in which liquid can be present or materials can be accumulated on the wall, particularly oil.

In the case where the randomly shaped metal wall is a magnetic wall, it is advantageous to have a magnetic saturation of the area of the wall located between the area which is of interest of the medium to be measured and the detection means, so that the wall is made magnetically transparent.

Figure 4A:
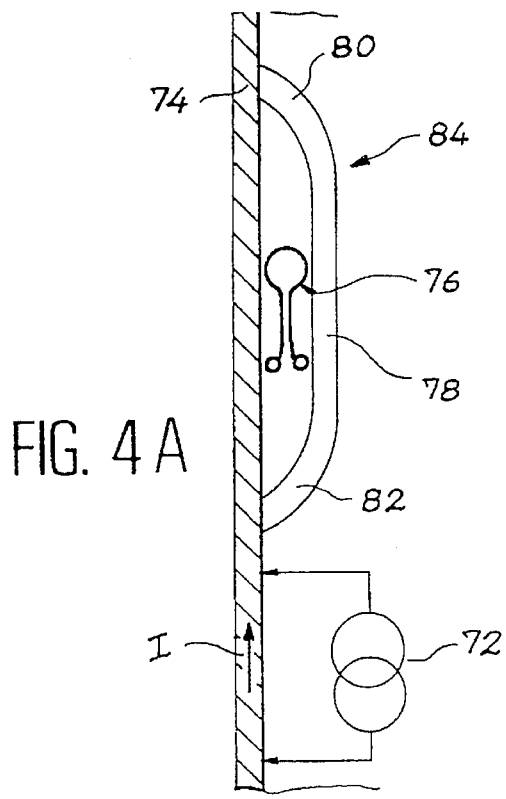
FIGS. 4A & 4B Within the scope of the invention, an embodiment of a saturating element for a substantially planar wall.
Figure 4B:
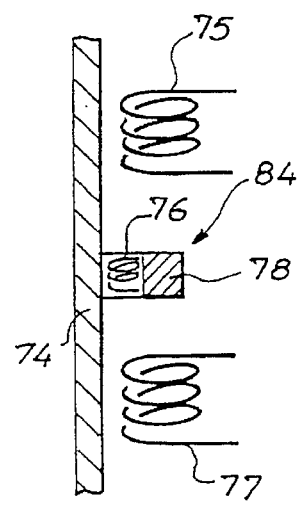

In the case of a substantially planar wall, a device for the magnetic saturation of the wall is illustrated in FIGS. 4A and 4B. In FIG. 4A, reference 72 designates a current generator, like that described hereinbefore in conjunction with FIG. 1 and which permits the injection of a current I into the wall 74. A detection coil 76 is located in the vicinity of the wall. To eliminate the magnetic screening effect of the wall, a saturator is provided and is formed by a longitudinal, median part 78 extended by two lateral ends 80, 82 inwardly curved with respect to the medium part and each terminated by a surface intended to come into contact with the metal wall 74. The median part is either made from a soft magnetic material forming the core of a not shown electromagnet, or a hard magnetic material serving as a permanent magnet, or a combination of both. The same device is shown in FIG. 4B, where the saturator is shown in plan view in section along a plane perpendicular to the wall 74 and the median part 78. The current generator, located beneath the saturating element 84 in FIG. 4A is not shown in FIG. 4B. Apart from the detection coil 76, or in replacement thereof, can be provided detection coils 75, 77 on either side of the saturator 84 and which also benefit from the saturation effect produced by the latter in the wall. FIGS. 4A and 4B show only one saturator 84, but several saturators of the type shown in FIG. 4A can be arranged parallel to one another, so as to widen the area of the wall 74 where a magnetic saturation occurs.

Figure 5A:
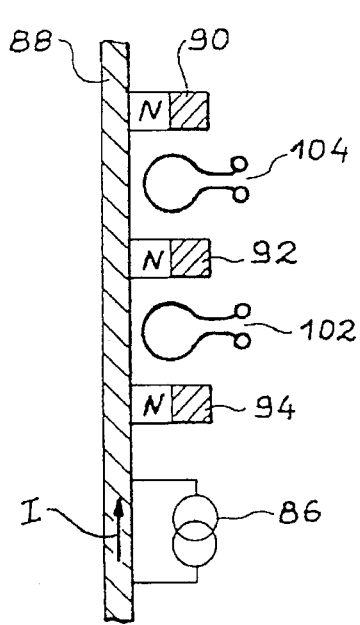
FIGS. 5A to 5C Other embodiments of saturating elements for a substantially planar wall.
Figure 5B:
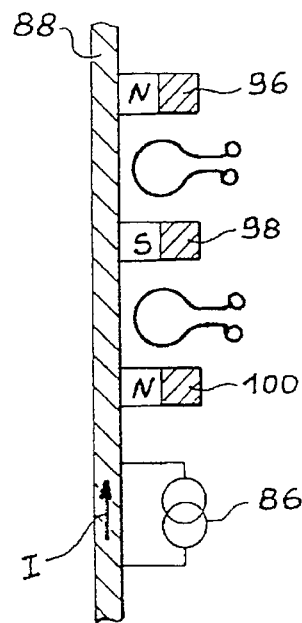

FIGS. 5A and 5B show a device operating on the principle according to the invention, with a current generator 86 for bringing about a circulation of a current I in the wall 88, which is substantially planar. Several saturating elements 90, 92, 94 are applied to the wall, each being formed in the same way as the saturating element 84 described relative to FIG. 4A, i.e. having a median, longitudinal part extended by two lateral ends, which are inwardly curved relative to the median part and each terminated by a surface which has to come into contact with the metal wall 88. Each magnetic circuit can be a circuit supplied by an electromagnet, or a permanent magnet, e.g. of AlNiCo, or a combination of both. Within the plurality of magnetic circuits, two adjacent magnetic circuits can be arranged so as to have the same magnetic orientation, as in FIG. 5A, or a magnetic orientation at 180° from one another, as in FIG. 5B. The variation between the two adjacent magnetic circuits can be determined at random. These different parameters (variation, polarization direction) will determine the different paths for the circulation of the magnetic saturation flux. It is clearly also possible to use a single saturating element, such as element 94 in FIG. 5A, without using other elements such as the elements 90, 92. The magnetic saturation area is then more limited.

Figure 5C:
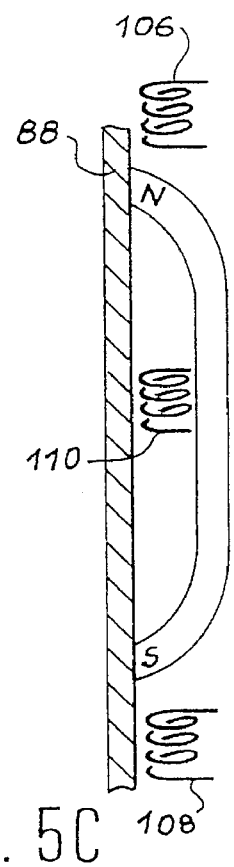

The detection coils will be located in preferred manner in the vicinity of the wall 88. They can be located either between two adjacent saturators, such as e.g. the coils 102, 104 in FIG. 5A, or in the vicinity of one or more lateral ends of a saturator, like the coils 106, 108 in FIG. 5C, which is a plan view of one of the saturators of FIGS. 5A or 5B, or directly between the median part of a saturator and the wall 88, like coil 110 in FIG. 5C. All combinations of these different positions for the detection coils are also possible.

Figure 6A:
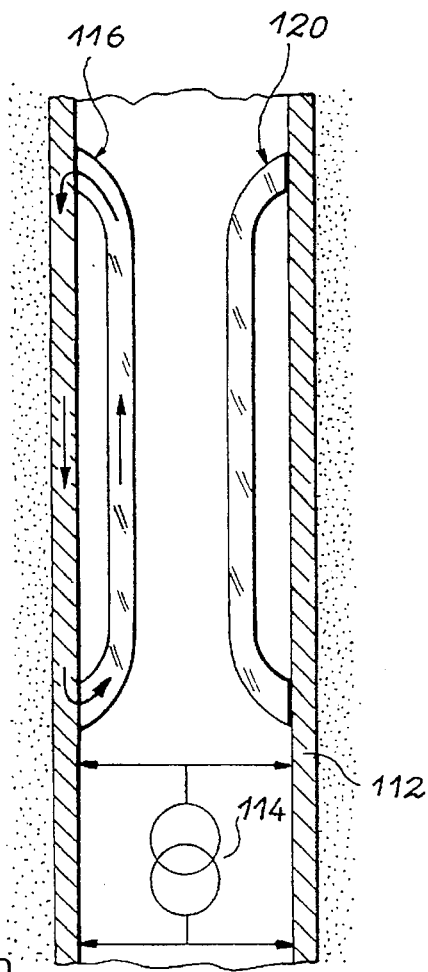
FIGS. 6a & 6b Sectional and plan views of a device according to the invention, incorporating saturators according to a first embodiment in a cased well.
Figure 6B:
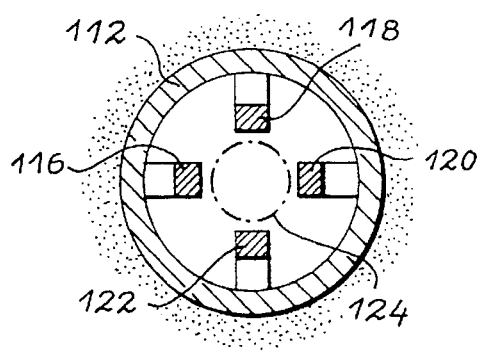

FIGS. 6a and 6b show the arrangement of the saturators for a magnetic, metal wall 112 having a generally cylindrical shape, such as the casing of a well. A current generator 114 in contact with the wall, in accordance with one of the configurations described in conjunction with FIGS. 2A and 2B, inject a current I into said wall. The saturators 116, 118, 120, 122 make it possible to saturate a well casing wall area in which are located one or more detection coils, which are not shown in the drawings. The saturators have a shape and a constitution similar to those described in conjunction with FIG. 4A. Four saturators are shown in FIGS. 6a and 6b. According to a not shown variant, it is also possible to have one, two, three or more than four elements in contact with the wall. In the case of a substantially cylindrical wall, the median parts of the different circuits will preferably be parallel to one another.

Due to the existence of magnetic attraction forces between the saturators and the wall, in general terms and no matter whether the wall is planar or cylindrical, said device makes it possible to reduce the gaps between the saturators and the wall to virtually 0 and consequently reduce the magnetic energy necessary for saturating the wall. Due to the fact that the saturator is directly applied to the wall, any disturbing or interfering effect linked with a variation of the surface of the wall, or in the case of a tube linked with the variation of the tube diameter, is eliminated.

In the configuration shown in FIGS. 6a and 6b, the detection coils can be placed at any point in the vicinity of that portion of the wall 112 which is magnetically saturated, e.g. according to an arrangement similar to that described in conjunction with FIGS. 4A and 4B. The reception coils can also be located within a volume 124 (cf. FIG. 6b) with an approximately cylindrical shape and which it is possible to define as the volume defined by the longitudinal elements of the saturators, said longitudinal elements defining the generatrixes of the cylinder 124.

Figure 7A:
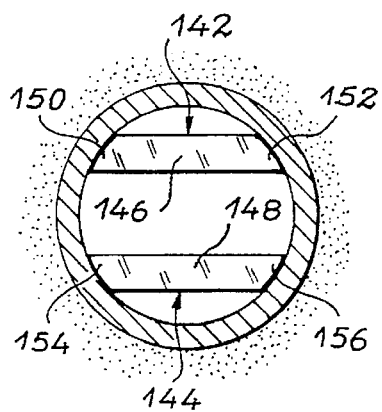
FIGS. 7a & 7b Plan and sectional views of a device according to the invention, incorporating saturating elements according to a second embodiment and located in a cased well.
Figure 7B:
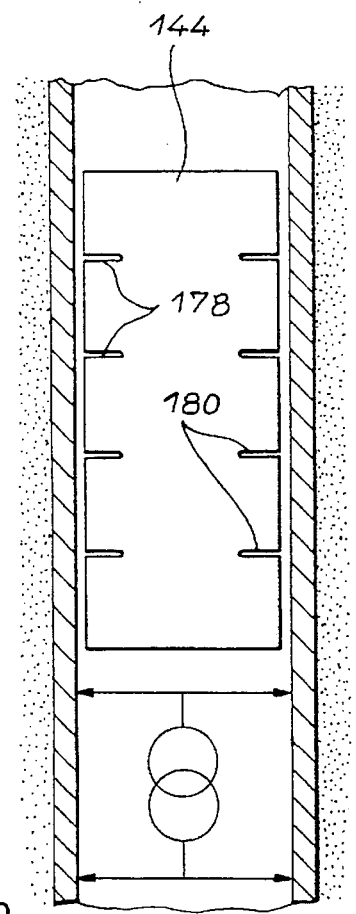

According to another embodiment illustrated in FIGS. 7a and 7b, the elements of a saturator assembly are constituted by two magnetic circuits 142, 144, each circuit having a central part 146, 148 substantially shaped like a plate and extended by two lateral parts 150, 152, 154, 156. The end of each of the lateral parts is intended to come into contact with the inner wall of the tube, in accordance with an area parallel to the tube axis.

The central part is made either from a soft magnetic material forming the core of an electromagnet not shown in the drawings, or a hard magnetic material serving as a permanent magnet, or a combination of both.

Figure 8A:
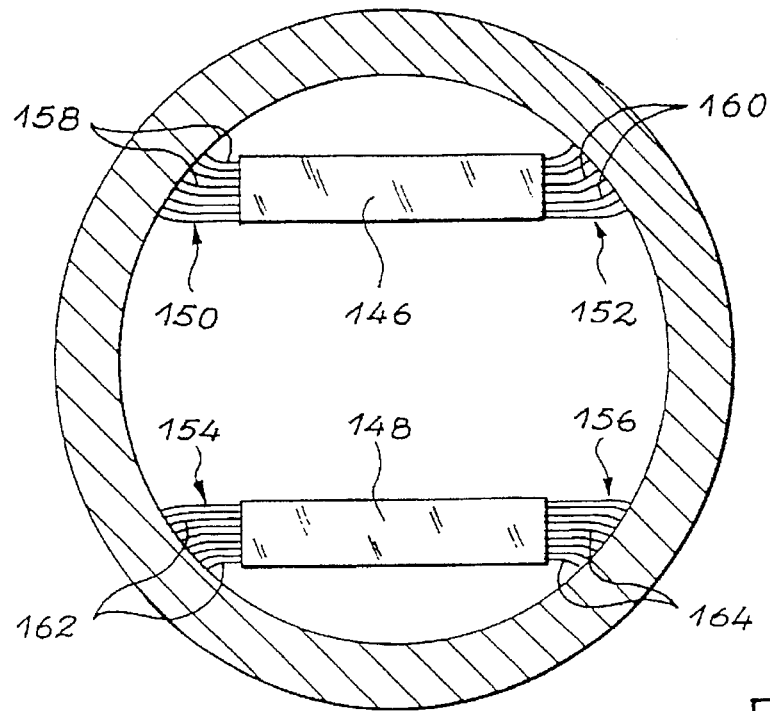
FIGS. 8a & 8b Two possible variants of magnetic circuits of a saturator for a device according to the invention.

As illustrated in FIG. 8a, the lateral parts 150, 152, 154, 156 can be formed by magnetic sheets or plates 158, 160, 162, 164 having a certain elasticity. The use of these sheets solves the problem of the magnetic contact between the magnetic circuit and the tube wall when irregularities are present. The elasticity of the sheets enables the ends of the lateral parts to adapt to the different surface configurations encountered.

Figure 8B:
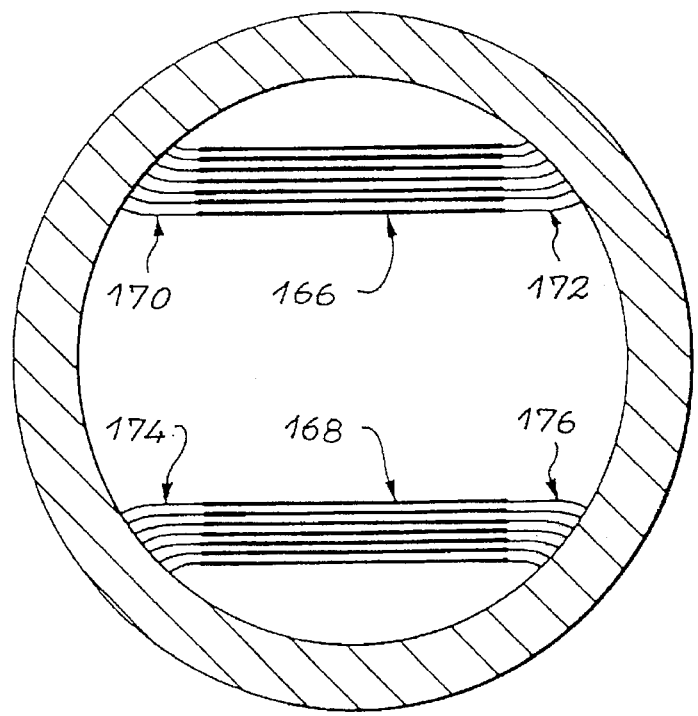

According to a variant illustrated in FIG. 8b, the central, plate-like part 166, 168 can itself be formed from magnetic sheets. The central part can be extended by metal lamellas forming a spring 170, 172, 174, 176, which permit the channelling of the magnetic flux in the direction of the wall. These lamellas can be formed from a single magnetic, elastic material, or an appropriate stack of lamellas of two types, one type being of soft material and the other of elastic material. As is illustrated in FIG. 7b showing an element of a saturator from the side, notches or cutouts 178 and 180 can be provided on the sides of each saturator, so as to ensure a better contact with the wall, if the latter suffers from irregularities.

In the second embodiment (FIGS. 7a to 8b), the polarities of two facing saturators can be opposite or identical, so that different paths can be obtained for the magnetic flux.

In all cases, the mechanical means can be used for moving the saturators away from the wall during the lowering or raising to the device in the well. In the case of an electromagnet, it will also be possible to interrupt the power supply of the magnetic circuit during these raising and lowering operations.

Figure 9:
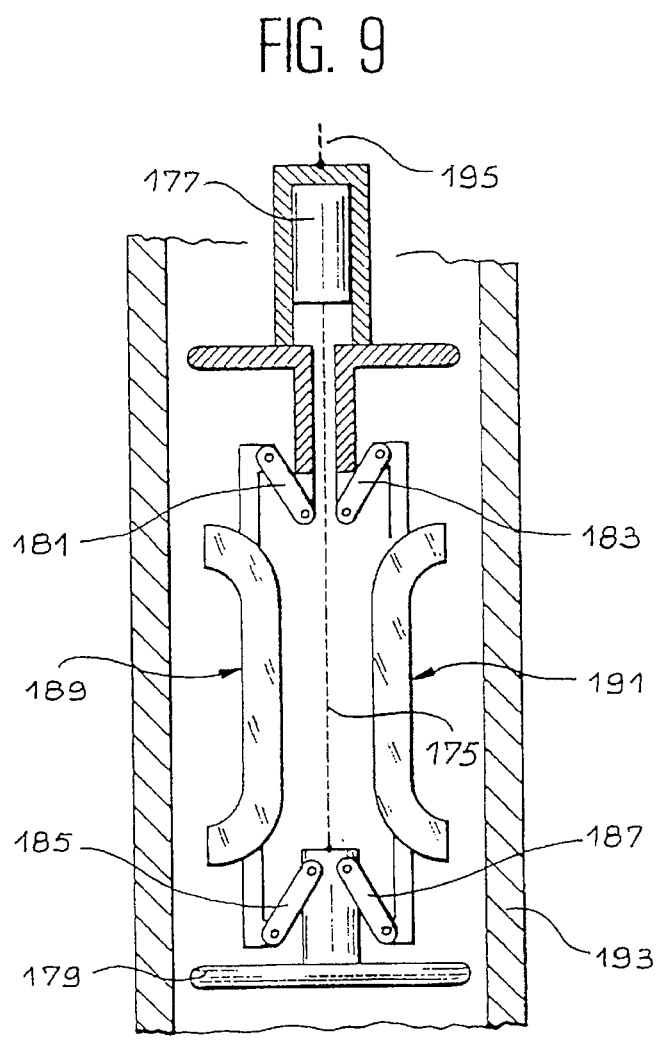
FIG. 9 A mechanism for moving the saturators away from the wall..

An example of a device for removing the magnetic circuits from the wall is illustrated in FIG. 9. An electric jack 177 makes it possible to raise a spacer 179 by means of a cable 175. The raising movement brings about a bending of the arms 181, 183, 185, 187 and brings the circuits 189, 191 towards the axis of the device and the tube 193 forming the wall. The complete device is suspended on a cable 195. The measuring coils are not shown in FIG. 9, but can be arranged in the manner described in conjunction with FIG. 6a. Finally, the same device can be used for saturators according to the second embodiment (FIGS. 7a, 7b, 8a, 8b).

The maximum frequency usable with the device according to the invention is a few kilohertz. In principle, the intensity of the signal increases with the frequency and the latter is limited due to the skin effect. For standard casing dimensions, the radial thickness of the measuring volume is a few dozen centimeters, so that the frequency is limited to a few kilohertz.

In the case where the magnetic circuit of the saturator is partly formed from metal sheets, as in FIGS. 8a and 8b, and in order to limit the shortcircuiting effect due to the presence of such sheets in the vicinity of the transmission and reception coils, the thickness of said sheets is preferably 2 to 3 times greater than the thickness on which the skin effect occurs in the constituent material of the sheets, at the frequency at which the device is used. Thus, for a frequency of 10 kilohertz, the sheets should have a thickness of a few millimeters.

Two other configurations of the device, in the case of the second embodiment described hereinbefore (plate-shaped saturator extended by lateral parts, whose end comes into contact with the inner wall of the tube) are illustrated in FIGS. 10a to 11b.

In said drawings, each of the references 192, 194 represents in overall terms an assembly comprising signal reception means. This assembly can e.g. be a pair of reception-counterreception coils. On either side of said assembly, in a longitudinal direction parallel to the tube, there are two saturation assemblies 196, 198, 200, 202 formed in the same way as described in conjunction with FIGS. 7a, 7b, 8a, 8b. Within the same assembly, the polarities of two magnetic circuits constituting said assembly can either be opposite (cf. FIG. 10b) or parallel (cf. FIG. 11b).

Figure 10A:
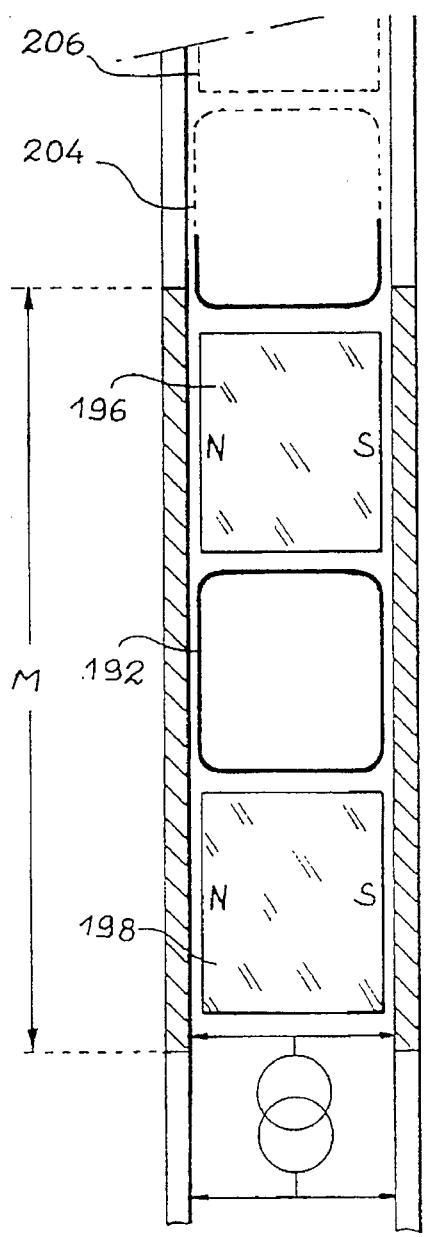
FIGS. 10a, 10b, 11a and 11b Two other possible configurations for the saturators, which alternate along a longitudinal axis in a cased tube.
Figure 10B:
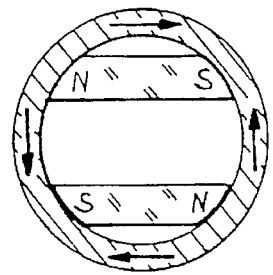

In the case of FIGS. 10a and 10b, where the magnetic circuits of the same saturator have opposite polarities, the magnetic saturation field resulting therefrom has a radial configuration, as illustrated by the arrows on the periphery of the tube in FIG. 10b. In the case where a detection assembly 192 is surrounded by two saturation assemblies 196, 198, the saturated area of the tube is then that designated by the letter M in FIG. 10a. It is possible to add, e.g. above the saturation assembly 196, another detection assembly 204, followed by another saturator 206, itself constituted by two magnetic circuits, whose polarities are oriented like those of the saturators 196, 198. The size of the saturated area of the tube is then increased.

Figure 11A:
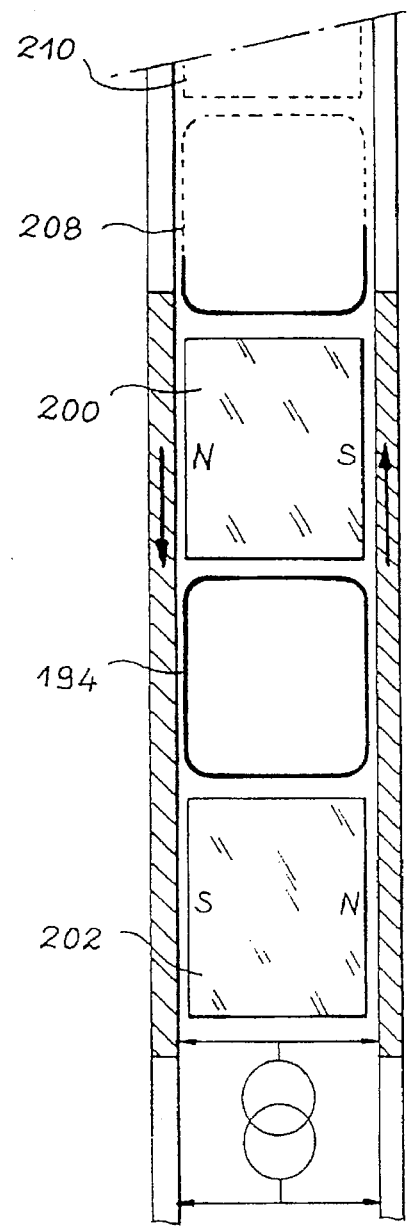
Figure 11B:
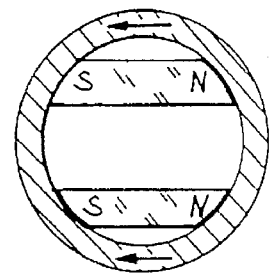

In the version of FIG. 11a, each of the saturation assemblies 200, 202 is constituted by two magnetic circuits, whose polarity is identically oriented. This leads to a saturation field having an axial configuration, whose circulation direction is that described by the arrows in FIGS. 11a and 11b. As in the previous case, it is possible to add, above the saturator 200, another detector 208, followed by another saturator 210, formed in the same way as elements 200, 202. Two adjacent saturators, e.g. 200 and 202 can have, as illustrated in FIG. 7a, polarization directions oriented at 180° from one another. However, the polarization directions could also be oriented by 90°, or by any other angle. Thus on each occasion different paths are obtained for the circulation of the magnetic saturation flux and this can be adapted by the expert as a function of the circumstances.

It is obviously possible to generalize this teaching to a number N of saturation assemblies alternating with reception assemblies of the signals retransmitted by the medium to be measured.

The embodiments described in conjunction with FIGS. 10a to 11b make it possible to solve the problem of the dimensions of the saturators. When the energy necessary for saturating the walls is higher, it is necessary to use more voluminous saturators. For this purpose, use can be made of one of the staged configurations described hereinbefore.

Figure 12:
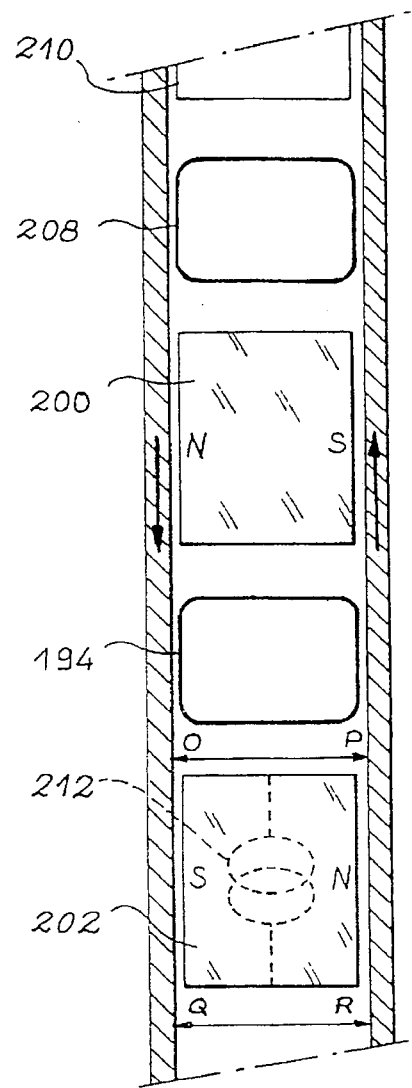
FIG. 12 Another embodiment of the invention.

According to a variant of the embodiments described in conjunction with FIGS. 10a to 11b, it is also possible to contact the current generator with the wall, but with contact points thereof located on either side of a saturator. This is illustrated in FIG. 12, where the generator 212 is in contact at four points OPQR with the metal wall, the points O and P being located above the saturation assembly 202 and the points Q and R beneath said assembly. This configuration permits the study of different areas of the medium in question. In particular, it makes it possible to study shallow areas of the geological formation because, in this case, the receivers are close to the transmitter, the investigation depth being substantially equal to the distance between the transmitter and the receiver. The other numerical references in this drawing designate identical elements to those of FIG. 11a.

We claim:

1. A device for the measurement by induction of a medium, in the presence of a metal wall comprising:

a transmission portion inducing a signal in the medium beyond a first side of the metal wall, said transmission portion including at least one current generator connected to the metal wall at two spaced apart points on a second side of the metal wall so that a current flows in a portion of the metal wall between the two separated points from the current generator, said current inducing said signal beyond the first side of the metal wall; and a receiver for receiving a signal retransmitted by the medium in response to the medium receiving the induced signal, said receiver being situated on the second side of the metal wall with the current generator.

2. The device according to claim 1, further comprising: rubbing contacts establishing the two spaced apart points on said second side of the metal wall.

3. The device according to claim 2, wherein the rubbing contacts each have a rough surface for making contact with the second side of the metal wall.

4. The device according to either one of the claims 2 and 3, the rubbing contact being held in contact with the second side of the metal wall by magnets.

5. The device according to either one of the claims 1 and 2 further comprising: at least one assembly that magnetically saturates at least a part of the metal wall located between a portion of the medium and the receiver.

6. The device according to claim 5, wherein the at least one magnetically saturating assembly includes at least one magnetic circuit directly connected to the second side of the metal wall.

7. The device according to claim 6, wherein the at least one magnetic circuit includes a central part and two lateral ends, said two lateral ends being inwardly curved relative to the central part and terminated by a surface which contacts the second side of the metal wall.

8. The device according to claim 7, wherein the central part is selected from the group consisting of a soft magnetic material forming a core of an electromagnetic, a hard magnetic material serving as a permanent magnet, or a combination of both.

9. The device according to claim 7, wherein there are at least two magnetic circuits and the central part of each of the at least two magnetic circuits are provided in a parallel relationship to one another.

10. The device according to claim 9, wherein said receiver is distributed within a volume having a substantially cylindrical shape, with the central parts of the at least two magnetic circuits defining generatrixes of said substantially cylindrical volume.

11. The device according to claim 6, wherein said at least one magnetic circuit includes a central, plate-shaped part surrounded by two lateral ends, said ends being in contact with the second metal wall formed as an inner wall of a metal tube along an area of the inner wall parallel to the metal tube longitudinal axis.

12. The device according to claim 11 wherein the central part is selected from the group consisting of a soft magnetic material forming the core of an electromagnet, a hard magnetic material serving as a permanent magnet, and a combination of both.

13. The device according to claim 11, wherein the central part is formed of layered magnetic sheets.

14. The device according to claim 11, the lateral ends being formed as layers of magnetic sheets.

15. The device according to claim 11, the lateral ends being formed as metallic spring elements.

16. The device according to claim 11, wherein cut-outs are formed in at least one lateral end of the at least one magnetic circuit.

17. The device according to claim 11, wherein two magnetic circuits are provided, with at least the central part of each magnetic circuit being arranged in parallel.

18. The device according to claim 17, wherein two magnetically saturating assemblies are provided, each of the two magnetically saturating assemblies being located on a common axis displaced a predetermined distance from one another with said receiver being located in the predetermined distance between the two magnetically saturating assemblies.

19. The device according to claim 18, wherein there are two magnetic circuits arranged in each of the two magnetically saturating assemblies so that the two magnetic circuits in each of the two magnetically saturating assemblies have the same magnetic orientation.

20. The device according to claim 19 wherein a magnetic orientation of each of the two magnetic circuits in each of the two magnetically saturating assemblies is at 180° relative to one another.

21. The device according to claim 19 wherein a magnetic orientation of each of the two magnetic circuits in each of the two magnetically saturating assemblies is at 90° relative to one another.

22. The device according to claim 18, wherein the current generator is in contact with the second side of the metal wall on one side of the two magnetically saturating assemblies and on the other side of said two magnetically saturating assemblies.

23. The device according to claim 1, the metal wall being the metal wall of a well casing.

24. The device according to claim 1, the metal wall being a metal wall of a nuclear power station.

* * * * *